United States Patent [19]

Wright et al.

[11] Patent Number: 4,688,974
[45] Date of Patent: Aug. 25, 1987

[54] COOPERATING BOLSTER AND FIXTURE CONSTRUCTION FOR QUICK-CHANGE FIXTURING

[75] Inventors: Larry E. Wright; John A. Mayberry, both of Ottumwa, Iowa

[73] Assignee: Deere & Company, Moline, Ill.

[21] Appl. No.: 811,256

[22] Filed: Dec. 20, 1985

[51] Int. Cl.⁴ .............................................. B23Q 3/06
[52] U.S. Cl. ..................................... 409/219; 269/20; 269/48.1; 269/309
[58] Field of Search ...................... 29/56.6, 57, 281.1; 409/219, 225, 227; 408/79; 269/48.1, 49, 50, 292, 293, 294, 309, 20, 900, 329, 93, 94

[56] References Cited

U.S. PATENT DOCUMENTS

| | | | |
|---|---|---|---|
| 3,831,955 | 8/1974 | Plotzke | 269/48.1 |
| 4,073,215 | 2/1978 | Coope et al. | 409/219 |
| 4,275,983 | 6/1981 | Bergman | 269/20 |
| 4,298,195 | 11/1981 | McDongal | 269/900 X |
| 4,413,819 | 11/1983 | Lenz | 269/93 X |
| 4,444,541 | 4/1984 | Bergman | 269/309 X |
| 4,577,847 | 3/1986 | Schedwin | 269/309 |

FOREIGN PATENT DOCUMENTS

| | | | |
|---|---|---|---|
| 2607506 | 8/1977 | Fed. Rep. of Germany | 269/48.1 |
| 3309555 | 9/1984 | Fed. Rep. of Germany | 269/20 |
| 205248 | 11/1984 | Japan | 269/20 |
| 79/00706 | 9/1979 | World Int. Prop. O. | 269/48.1 |
| 1263475 | 2/1972 | United Kingdom | 269/309 |
| 639681 | 12/1978 | U.S.S.R. | 269/310 |
| 745645 | 7/1980 | U.S.S.R. | 269/309 |

*Primary Examiner*—William R. Briggs

[57] ABSTRACT

A machine tool bolster includes a horizontal fixture support plate and a pressure-operable clamp device is vertically shiftably mounted to the underside of the plate and includes a clamp insert holder extending axially into a circular hole provided in the plate. A fixture is mounted to a locating plate provided with a receptacle adapted to receive the clamp insert holder when the clamp device is raised relative to the plate. A rod is connected to a piston of the clamp device and extends vertically through the holder. The upper end of the rod is conically shaped and acts against complementary shaped clamp inserts radially slidably mounted in the holder to shift them outwardly against a conically flared portion of the locating plate receptacle so as to clamp the fixture to the bolster.

6 Claims, 5 Drawing Figures

COOPERATING BOLSTER AND FIXTURE CONSTRUCTION FOR QUICK-CHANGE FIXTURING

BACKGROUND OF THE INVENTION

The present invention relates to machine tools of the type including a bolster adapted for having workpiece fixtures selectively mounted thereon and more specifically relates to a cooperating bolster and fixture design which permits fixtures to be easily and quickly changed.

A common type of machine tool bolster includes a support surface having a plurality of parallel grooves or T-slots formed therein for the purpose of receiving clamping elements such as bolts and the like which are used to secure workpiece fixtures to the bolsters. In order to properly space a given workpiece from the head or spindle of the machine tool, various spacer blocks, clamp bolts of different lengths and clamps of different sizes must be kept on hand. The time for fixturing a given workpiece to the bolster can often be considerable and proper placement of the fixture on the bolster for the proper alignment of a workpiece to the head or spindle can often be quite tedious since it is usually done by trial and error. A further drawback of using a bolster having T-slots formed in its support surface is that it is difficult and costly to clean metal particles and/or cutting oil from the slots.

SUMMARY OF THE INVENTION

According to the present invention there is provided an improved machine tool bolster and workpiece fixture combination.

An object of the invention is to provide a machine tool bolster and workpiece fixture designed to cooperate so as to permit the fixture to be easily and quickly clamped to and released from the bolster.

A further object of the invention is to provide a cooperating clamping system embodied in a bolster and machine tool fixture which allows the bolster to be made with an easy to clean, planar, fixture support surface.

A more specific object of the invention is to provide a cooperating clamping system, as set forth in the immediately preceding object, which includes a piston operated clamp located centrally in a planar support surface of the bolster and operable for entering a receptacle of and for clamping a fixture mounting plate to the bolster planar support surface.

Yet another object of the invention is to provide a fixture mounting plate and bolster support surface which have cooperating locating surfaces which correctly position the fixtures carried by the mounting plate so that a fixtured workpiece is in correct alignment with the machine tool head or spindle.

These and other objects, features and advantages of the present invention will become apparent to those skilled in the art from the description which follows and from the drawings.

DESCRIPTION OF THE PREFERRED EMBODIMENT

Figure 1:
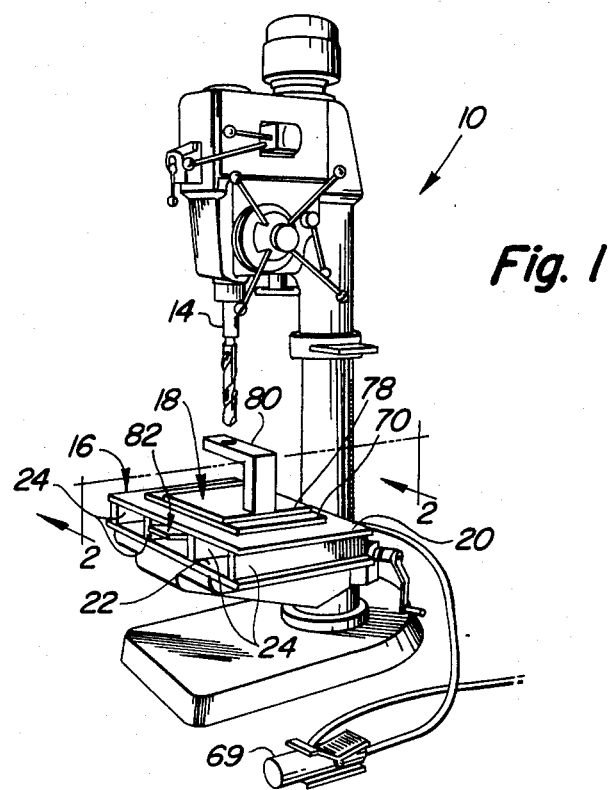
FIG. 1 is a perspective view of a machine tool embodying a bolster constructed in accordance with the present invention and having a cooperating fixture clamped thereto.
Figure 5:
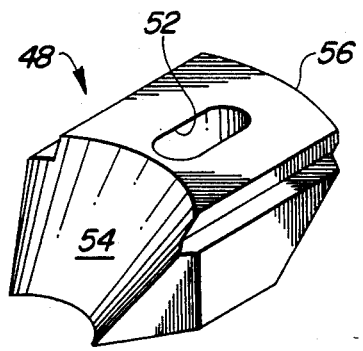
FIG. 5 is a perspective view of one of the clamp inserts.

Referring now to FIG. 1, there is shown a machine tool here represented as a drilling machine 10. The machine 10 is a conventional type including a workpiece support bed 12 located beneath a tool head 14 which is mounted for vertical movement relative to the bed 12. Mounted to the bed 12 is a bolster 16, which takes the place of the conventional bed 12, and has a workpiece fixture 18 releasably clamped thereto in a manner described hereinbelow. It is to be understood that while the bolster 16 is here shown in a form adapted for mounting to the bed of a conventional machine tool, a machine tool could be designed so as to incorporate a structure similar to the bolster 16 in lieu of the conventional bed 12.

Figure 2:
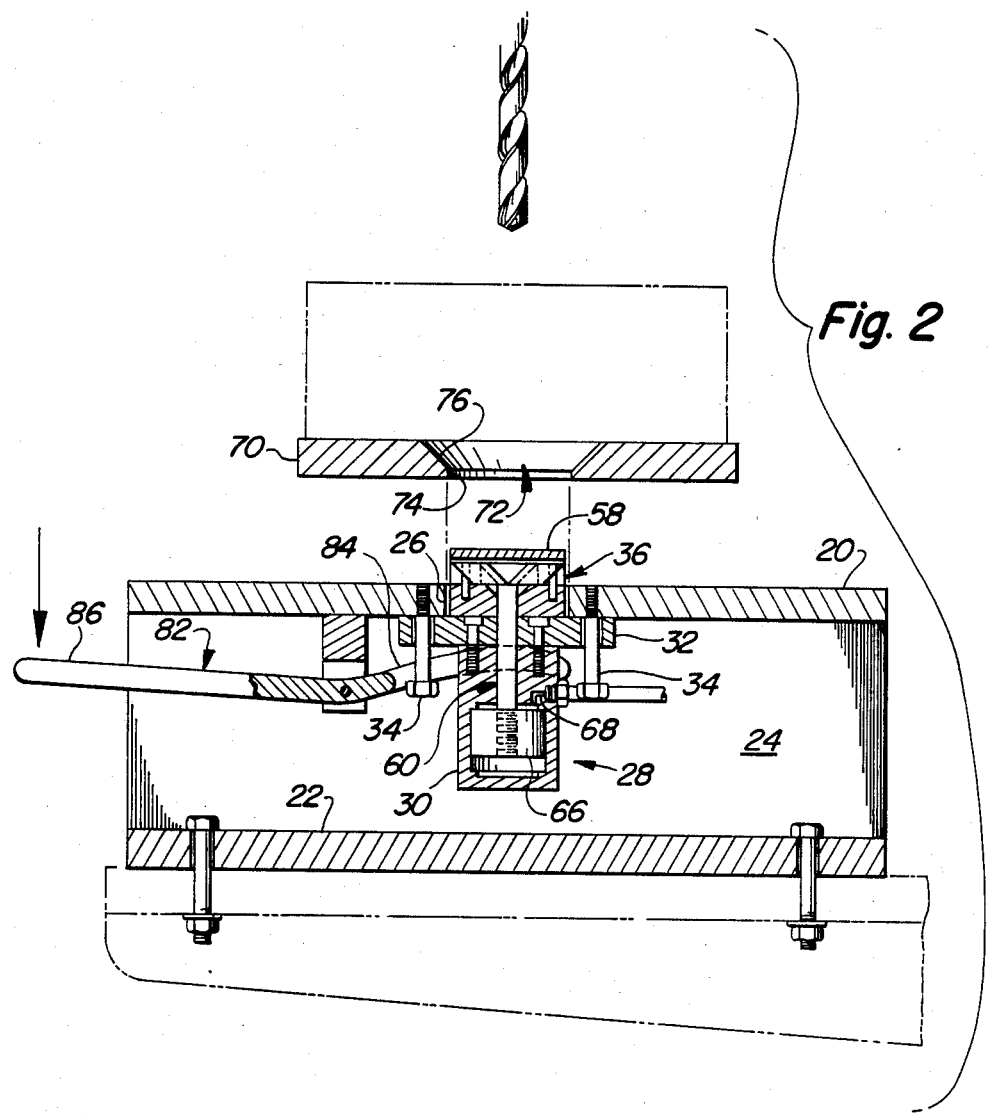
FIG. 2 is a vertical sectional view taken along line 2—2 of FIG. 1, but showing the clamp device in an unpressurized condition with the clamp inserts retracted and showing the fixture locating plate removed from the clamp device.
Figure 4:
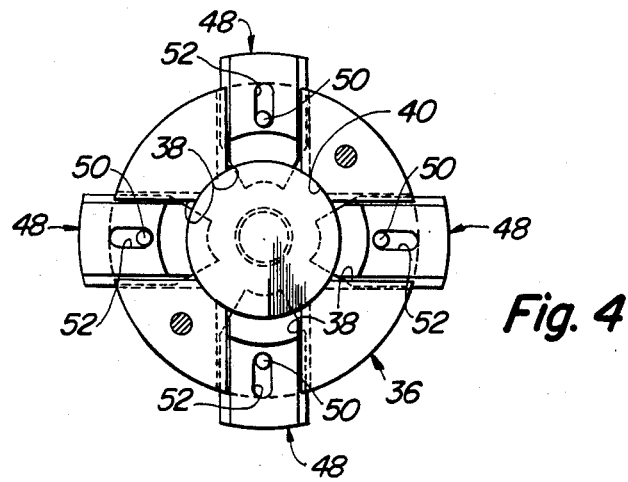
FIG. 4 is a horizontal sectional view taken along line 4—4 of FIG. 3 showing the clamp inserts positioned in the insert holder guide slots and showing the top of the actuating rod.
Figure 3:
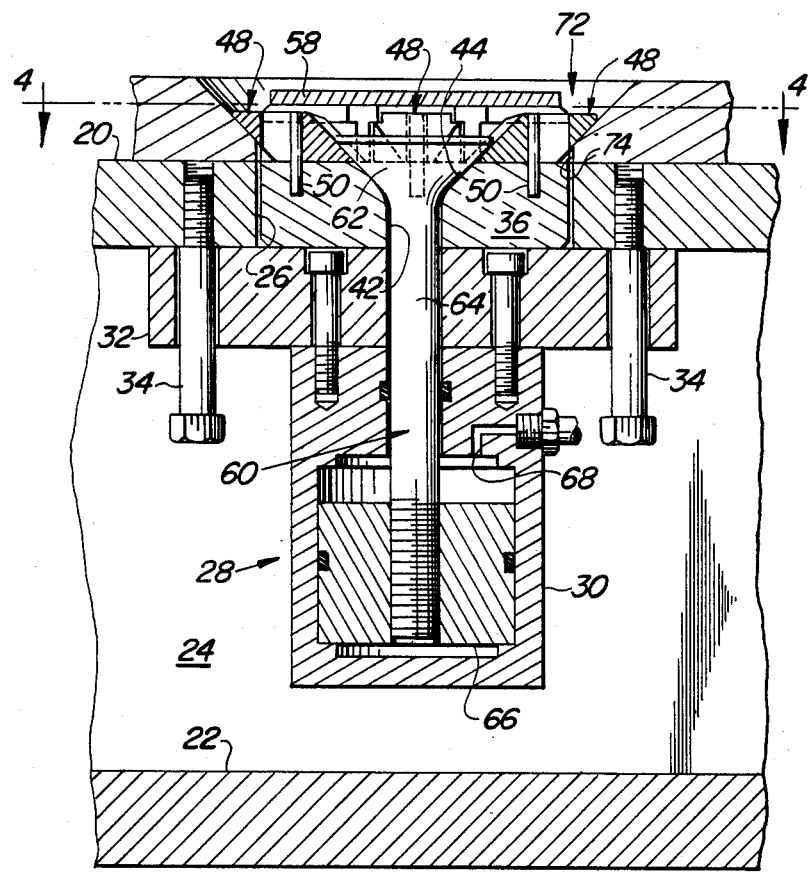
FIG. 3 is an enlarged vertical sectional view of the clamp device shown pressurized with the clamp inserts extended and engaged with the fixture locating plate.

The bolster 16 includes upper and lower horizontal plates 20 and 22, respectively, held in vertically spaced, parallel relationship to each other by a plurality of vertical, parallel ribs 24. Referring now also to FIGS. 2 and 3, it can be seen that located centrally in the upper plate 20 is a circular hole 26. A pressure actuatable clamp device 28 includes a cylinder 30 mounted beneath the plate 20 in axial alignment with the hole 26 by means of a mounting plate 32 which is fastened to the upper end of the cylinder 30 and slidably received on a plurality of vertical bolts 34 screwed into the bottom of the plate 20. Located within the hole 26 and fastened to the mounting plate 32 is a cylindrical clamp insert holder or mount 36. As can best be seen in FIGS. 3 and 4, the upper face of the insert holder 36 is provided with four radially extending insert guides 38 in the form of T-slots arranged at ninety degree intervals about the center of the holder, the guides having inner ends opening into a circular counterbore 40 extending axially into the holder 36. A bore 42 having a conically flared upper end 44 extends axially through the holder 36 from the bottom of the counterbore 40. A clamp insert 48 is slidably mounted in each guide 38 for radial movement between an inward or retracted position, that occupied by the inserts in FIG. 2, and an outward or extended position, that occupied by the inserts in FIGS. 3 and 4. Provided for stopping each of the inserts 48 at its inward and outward positions is a vertical pin 50 received in a vertical, radially elongated slot 52 extending through the insert and anchored in a blind hole provided centrally in the bottom of a respective guide 38. Each insert 48 is generally parallelogram shaped in side view (FIGS. 2 and 3). Specifically, each insert 48 has parallel top and bottom surfaces, opposite side surfaces and, of particular significance, radially inner and outer end surfaces 54 and 56, respectively. The end surfaces 54 and 56 are frusto-conical segments which are disposed concentrically to the bore 42 when the insert is in its inward position. The radius of the bottom of the inner end surface 54 is equal to that of the bore 42 and the radius of the top of the outer end surface 56 is equal to that of the insert holder 36. Thus, when the inserts 48 are all in their respective retracted positions, they do not project beyond the outer circumference of the holder 36. The slope of the surfaces 54 and 56 to the horizontal is approximately forty-five degrees. The purpose of these surfaces is described below. Covering the upper face of the insert holder 36 is a thin, circular cover plate 58.

Provided for causing the inserts to be simultaneously moved from their retracted to their extended positions is a clamp-effecting rod 60 having a frusto-conical upper end 62 joined to a stem 64. The upper end 62 is shaped complementary to the inner end surfaces 54 of the inserts 48, the transition area between the end 62 and stem 64 is shaped complementary to the flared upper end 44 of the bore 42 and the stem 64 is slidably received in the bore 42. The stem 64 projects through a hole provided in the mounting plate 30 and has a lower end threaded into a piston 66 slidably received in the cylinder 30. The cylinder 30 contains a pressure port 68 located above the piston 66 and adapted for being selectively coupled to a source of pressurized fluid, such as that provided by an air-over-hydraulic pump 69 (FIG. 1), for example. When pressure is admitted to the port 68, the piston 66 moves downwardly and hence the rod 58 moves downwardly.

The workpiece fixture 18 comprises a fixture locating plate 70 provided with a clamp device receptacle 72 in the form of a hole having a cylindrical lower section 74 receiving the clamp insert holder 36 and having a conically flared upper end 76 shaped complementary to the outer end surfaces 56 of the inserts 48. A baseplate 78 of the fixture 18 is welded to the top of the locating plate 70 in closing relationship to the receptacle 72. A fixture element 80 is rigid with the top of the fixture baseplate 78 and serves to hold a workpiece (not shown) in place for having a hole drilled therein. A lever 82 is provided for elevating the clamp device 28 into position for subsequent actuation for effecting outward movement of the inserts 48 into engagement with the flared upper end 76 of the receptacle 72 to thereby apply a load clamping the fixture 18 to the bolster 16, as shown in FIG. 2. Specifically, as can best be seen in FIG. 2, the lever 82 is vertically pivotally connected to the upper bolster plate 20 and has an inner forked end 84 disposed beneath the mounting plate 32 in straddling relationship to the cylinder 30 and an outer end 86 which projects leftwardly beyond the bolster 16.

In operation, assuming the fixture 18 to be removed from the bolster 16, the clamp device 28 to be unpressurized and the lever 82 to be released, the plate 32 will be at a lower position on the bolts 34 wherein the top of the cover plate 58 is substantially flush with the top of the upper bolster plate 20. The bolster 16 is readied for receiving the fixture 18 by pressing down on the lever 82 which results in its forked inner end 84 acting to elevate the mounting plate 32 against the bottom of the upper bolster plate 20, as shown in FIG. 2. The insert holder 36 then projects above the plate 20. The fixture 18 is then moved into place with the receptacle 72 of the locating plate 70 being received on the insert holder 36. The cylinder 30 is then pressurized to cause the piston 66 and hence the rod 60 to move downwardly. Downward motion of the rod 60 results in its frusto-conical upper end 62 pressing downwardly on the inner end surfaces 54 of the inserts 48 so as to cause the latter to be forced outwardly to engage the outer end surfaces 56 of the inserts 48 with the conically flared upper end 76 of the receptacle 72 of the fixture locating plate 70 and thus, effect a downward load component which holds the fixture 18 tightly against the upper bolster plate 20. It is to be noted that the fixture elements 80 are then correctly positioned for holding a workpiece in a desired location relative to the tool head 14.

The fixture 18 may be removed for permitting use of a different fixture by merely releasing the pressure from the cylinder 30. Upon such release of pressure, the weight of the clamp device 28 and/or a lifting force applied to the fixture 18 will cause the inserts 48 to be forced inwardly which in turn results in the rod 60 and piston 66 being forced upwardly. Once the inserts 48 are located in their retracted position shown in FIG. 2, the fixture 18 may be removed. The fixture 18 could then be replaced by any fixture having a locating plate provided with a clamp device receptacle like the receptacle 72 of the plate 70. Therefore, the time needed to change over the machine 10 for performing different drilling operations on a given workpiece or for performing drilling operations on a different workpiece is greatly reduced, making it possible to keep workpiece inventory at a minimum. Further, because less fixture adjustment is required to properly align a workpiece with the work head 14, the probability of turning out a quality finished product is enhanced. Another benefit is that no loose hardware or clamps are required to be kept on hand for fastening fixtures to the bolster.

Because no grooves or slots are present in the upper plate 20 of the bolster 18, cleanup of metal cuttings, oil and the like from the bolster is relatively easy in comparison to cleaning a conventional bolster having slots in its support bed.

We claim:

1. A machine tool bolster and fixture combination, comprising: said bolster including a fixture support surface having an opening extending therethrough; a pressure-operable clamp device received in said opening and serving as sole means for clamping the fixture to the support surface; said clamp device including an upper end defined by a clamp element holder, a plurality of clamp elements mounted in the holder for horizontal movement between respective extended positions, wherein they extend beyond an outer periphery of the holder, and respective retracted positions and a pressure operable means for simultaneously moving said clamp elements from their retracted to their extended positions when pressurized; said fixture including a locating plate engaging said support surface and being provided with a receptacle receiving said clamp element holder; said receptacle including surface means surrounding the periphery of said holder and being disposed for engagement by and for cooperating with the clamp elements as sole means for effecting the disposition of the locating plate in a preselected location against said locating surface when the clamp means are moved to their extended positions by said pressure operable means, such movement also effecting clamping of the locating plate against the support surface.

2. The machine tool bolster and fixture combination defined in claim 1 wherein said fixture support surface is planar.

3. The machine tool bolster and fixture combination defined in claim 1 wherein said fixture support surface is defined by a support plate; said opening extending through said support plate; and connection means mounting said pressure operable clamp device to said support plate.

4. The machine tool bolster and fixture combination defined in claim 3 wherein said opening is cylindrical and said holder being cylindrical and located in said opening.

5. The machine tool bolster and fixture combination defined in claim 4 wherein said holder includes an upper surface having a counterbore extending axially thereinto and a plurality of guide slots extending radially to an outer circumference of the holder from said counterbore, and includes a bore extending axially through the holder from the counterbore; said clamp device including a cylinder located beneath said holder, a piston located in the cylinder and a rod extending through the bore in said holder and being secured to said piston; said rod having a conically shaped upper end; and said clamp element means including a plurality of clamp inserts respectively radially slidably mounted in said plurality of radial guide slots; said clamp inserts each having a radially inner end shaped complementary to the conically shaped upper end of said rod and a radially outer end which is parallel to the inner end; said surface means of the clamp device receptacle being shaped complementary to the outer ends of said inserts; and said upper end of the rod, inserts and holder being so dimensioned relative to each other that, when the piston is in an upper unactuated condition within the cylinder, the inserts are in inner positions wherein they do not project radially beyond the holder and when the piston is in a lower pressurized condition within the cylinder, the inserts are in outer positions wherein they extend radially beyond the holder.

6. The machine tool bolster and fixture combination defined in claim 3 wherein said fixture support surface is planar, said pressure-operable clamp device has a planar upper surface dimensioned complimentary to the opening extending through the support plate and said connection means includes a vertical guide means located beneath the support plate for guiding the clamp device between a lowered position wherein its planar upper surface is flush with the fixture support surface so as to permit easy cleaning of the fixture support surface and a raised position locating the planar upper surface above the fixture support surface so as to aid in locating the fixture on the fixture support surface.

* * * * *